United States Patent [19]
Nodine et al.

[11] Patent Number: 5,966,306
[45] Date of Patent: Oct. 12, 1999

[54] METHOD FOR VERIFYING PROTOCOL CONFORMANCE OF AN ELECTRICAL INTERFACE

[75] Inventors: Mark H. Nodine; Harold M. Martin; Anhtu Nguyen, all of Austin, Tex.

[73] Assignee: Motorola Inc., Schaumburg, Ill.

[21] Appl. No.: 08/888,588

[22] Filed: Jul. 7, 1997

[51] Int. Cl.[6] .............................. G06F 19/00; G06G 7/48
[52] U.S. Cl. ....................... 364/468.28; 364/578; 710/8; 710/113
[58] Field of Search ................................ 364/468.28, 578; 371/22.1; 438/14; 370/254; 395/283, 831; 710/8

[56] References Cited

U.S. PATENT DOCUMENTS

| | | | |
|---|---|---|---|
| 4,764,862 | 8/1988 | Barlow et al. | 395/200.83 |
| 4,825,438 | 4/1989 | Bennett et al. | 710/100 |
| 5,440,697 | 8/1995 | Boegel et al. | 395/500 |
| 5,455,911 | 10/1995 | Johansson | 710/44 |
| 5,566,347 | 10/1996 | Patrick | 395/831 |
| 5,590,355 | 12/1996 | Shichiku et al. | 395/800.26 |
| 5,623,499 | 4/1997 | Ko et al. | 371/22.1 |
| 5,663,076 | 9/1997 | Rostoker et al. | 438/14 |
| 5,699,350 | 12/1997 | Kraslavsky | 370/254 |
| 5,758,101 | 5/1998 | Pemberton | 395/283 |

OTHER PUBLICATIONS

Gerard J. Holzmann, "Basic Spin Manual," Bell Laboratories, Murray Hill, NJ 07974, pp. 1–32.

Oded Maler, Sergio Yovine, "Hardware Timing Verification Using KRONOS," Spectre–Verimag, Miniparc–zirst, 38330 Montbonnot, France, pp. 1–8.

Gerald J. Holzmann, "Design and Validation of Computer Protocols," Synopsis, Prentice Hall, 1991, Chapter listing only, full book available to "Researchers and professionals".

*Primary Examiner*—William Grant
*Assistant Examiner*—Carolyn T. Baumgardner
*Attorney, Agent, or Firm*—Susan C. Hill

[57] ABSTRACT

A method and technique for verifying bus protocol in the design of integrated circuits. A correctness evaluator receives simulation results from a monitor file and prediction information generated from protocol templates. The correctness evaluator operates according to a "clean bus" theory that an error includes those events not specified by the circuit specification, including spurious transitions. Protocol templates define the elements within the circuit, and are provided to a prediction generator which creates a prediction file. The correctness evaluator compares a simulation monitor file to the prediction file, and outputs a pass or fail result. The present invention offers a flexible method to separate protocol-defined timing constraints from implementation-dependent timing constraints. The present invention allows input from a test program to tailor bus signal change predictions and verify that the test program performs as it is programmed to perform.

23 Claims, 7 Drawing Sheets

METHOD FOR VERIFYING PROTOCOL CONFORMANCE OF AN ELECTRICAL INTERFACE

FIELD OF THE INVENTION

The present invention relates generally to integrated circuit design and more particularly to the design and manufacture of integrated circuits having been verified for conformance to a protocol.

BACKGROUND OF THE INVENTION

There is a continuing trend in the semiconductor industry towards higher circuit complexities within chips. These higher complexities are fueled by the progressive in reduction of feature sizes and the demand for ever more powerful microprocessors. As chip complexity increases the bus interfaces connecting chips to the outside world become more complicated. Additionally, many chips have an internal bus allowing communication between the various internal modules. It is important to ensure all the buses in a chip function correctly, as a single defect is almost certain to be encountered sometime during the operation of the chip. For example, one defect affecting some corner case of the bus protocol may result in a non-recoverable error. It is especially important to verify internal buses prior to the production of silicon. Internal buses are subject to all the problems of external buses with the additional constraint that they are by definition not visible from the outside. Therefore, the facilities for debugging them once the chip has been reduced to silicon are limited. Redesigns to fix problems are extremely costly, as they incur mask costs, fabrication costs, and delays in business.

Buses are inherently difficult to verify functionally because they usually contain a large number of signals. Many of these signals are bi-directional, so the possibility of a conflict due to poorly timed Bus Interface Units (BIUs) is probabilistically quite large. Counting all the address, data, and control signals, it is not unusual for a modern bus to have 100 or more bits of information. Considering the state space for the bus to be the Cartesian product of the states of the individual bits that compose it and the internal protocol state machines of all the agents that connect to it, it is obvious that trying to verify a bus by doing a complete state space search is untenable. Even viewing the address and data buses as representing a single state, the remaining state space is still impracticably large. It is therefore necessary to have a formal methodology for bus protocol verification that limits the testing to those states that are realizable within the protocol space.

One of the problems faced by the designer of a hardware chip or board is ensuring that devices attached to a bus conform to the bus protocol, where a bus is a set of signals that must be driven according to a specifiable protocol in order to achieve a desired result. Commonly, buses are used for transferring data, and the protocol specifies how read and write transactions may occur on the bus. The typical way a bus interface controller is verified is to create a behavioral model that exercises all supported transactions across the bus. If the operation completed without hanging the bus, it has passed the first level of test. A second level of test would then perform data compares of data written to a specific memory or address space. A third level of test would further include register read/write operations to check the integrity of the bus interface controller's registers. This strategy only checks to see if the bus is functional and does not verify compliance to the protocol.

Another method includes a bus monitor in the similation. The bus monitor deduces what transactions are taking place on the bus based on sampling signals at times of relevance to the protocol. These deduced transactions can then be compared against the intended ones to determine correctness at some level.

Many design solutions implement a graph-based representation, and make predictions based on the relations described therein. One alternative to using a graph-based representation for predictions is to do a cycle accurate prediction based on the test and compare the exact wave forms with those output by the simulation. These methods do not address issues such as noise detection, optional transitions, prediction of expected signal transitions, the modularity of the protocol, and operation outside of a strict cycle accurate approach. These methods lack the ability to check the correct behavior of other bus agents such as a bus arbiter or a pipe depth controller. Such agents may appear to function correctly but may in fact be designed differently from the specification. Additionally, the bus interface controller logic may deviate from specification while appearing to function properly in most cases. If such misbehavior is not flagged, the unintended logic feature goes undetected in design. Other methods use prediction where the bus interface controller is verified by predicting register results or data values at memory address locations. The results are predicted based on the test program to be executed. These methods are known as data prediction and data integrity methods.

A method referred to as resilient bus system has the receiving bus interface unit check the validity of certain pertinent signals. If any one of the signals is not valid the receiving bus unit rejects the request. The resilient bus system method does not verify the correct behavior of the rejection logic nor does it identify the source of the invalid bus signals.

Verification methods typically lack a way to verify whether the bus master device correctly requested a read or write as indicated by the test program. For example, if the test program asked for a read but the master requested a write, most verification programs would not detect this inconsistency. Additionally, if the master correctly asks for a read but performs a non-burst instead of an expected burst operation, these methods would not detect this inconsistency either.

It is desirable to have a bus verification method that is applicable to many different buses and is able to predict future transitions. Additionally, such a method should not employ strict cycle accuracy but be able to allow for implementation-dependent variances in transition times where allowed by protocol. It is also critical that a verification program identify noise on the specifically, unpredicted transitions. Ideally, a verification method would be modular to comprehend the complexities of a variety of buses.

The present invention offers a method of verifying bus protocol conformance employing a prediction scheme in a second stage correctness evaluator. This methodology provides a way to detect noise on a bus occurring at times other than when the protocol specifies the signal should be sampled, to handle all contingencies in a consistent manner, to determine the correct coverage information, and reduce the complexity of bus monitoring. The present invention employs a modular approach to bus protocol verification.

DETAILED DESCRIPTION OF THE PREFERRED EMBODIMENT

Figure 1:
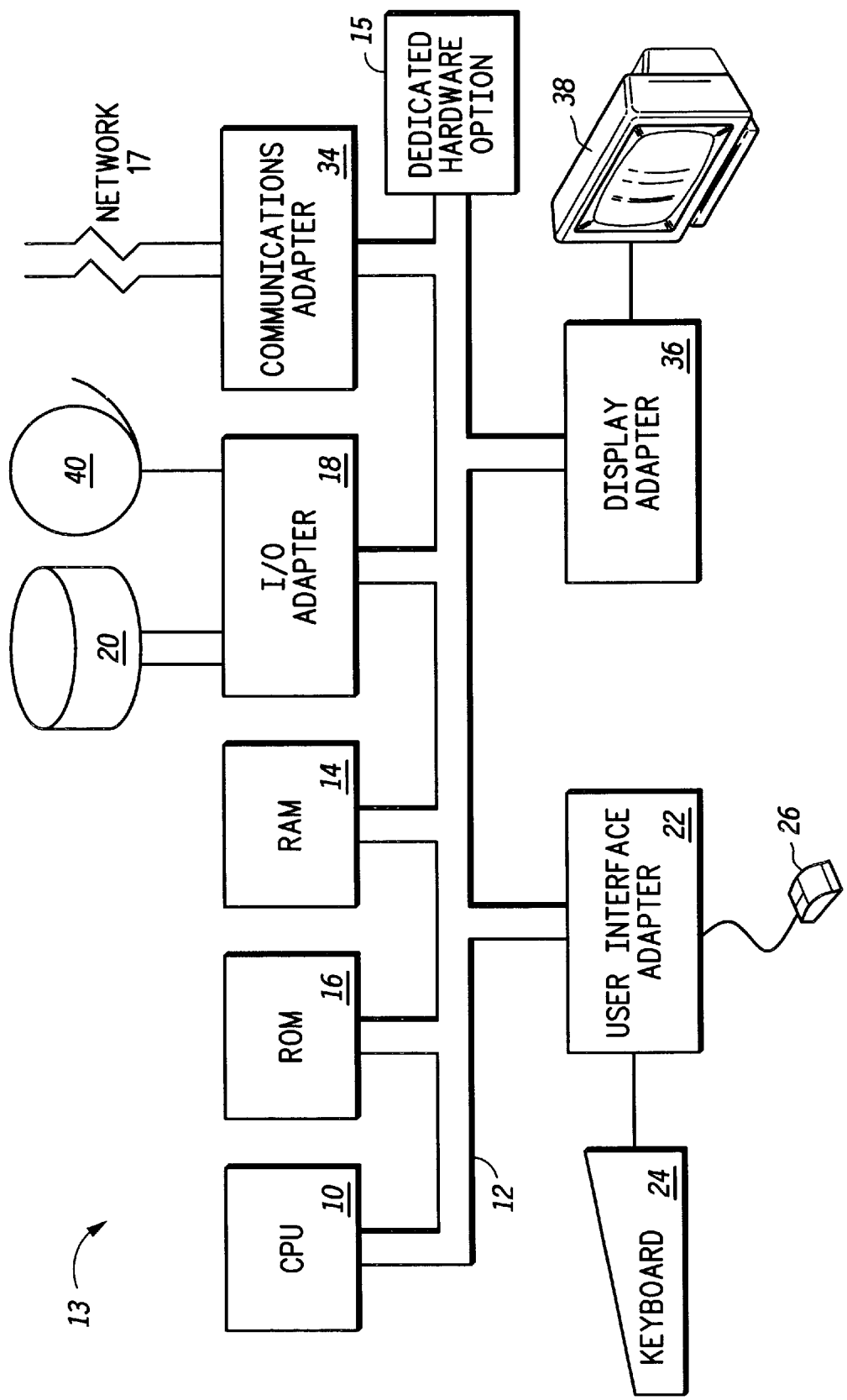
FIG. 1 is a block diagram of the system within which one embodiment of the present invention may be implemented.

The present invention provides an improved method and technique for verifying bus protocols in the design of integrated circuits. The following discussion details one embodiment of the present invention, which is illustrated in FIGS. 1–8, and is provided as an exemplar for clarity. The various methods discussed above may be implemented within dedicated hardware 15, or within processes implemented within a data processing system 13 as shown in FIG. 1. A typical hardware configuration of a workstation in accordance with the present invention is illustrated and includes a central processing unit (CPU)10, such as a conventional microprocessor, and a number of other units interconnected via system bus 12. The workstation shown in FIG. 1 includes random access memory (RAM) 14, read only memory (ROM) 16, and input/output (I/O) adapter 18 for connecting peripheral devices, such as disk units 20 and tape units 40, to bus 12. A user interface adapter 22 is used to connect a keyboard device 24 and a mouse 26 to the system bus 12. Other user interface devices such as a touch screen device (not shown) may also be coupled to the system bus 12 through the user interface adapter 22.

A communications adapter 34 is also shown for connecting the workstation to a data processing network 17. Further, a display adapter 36 connects the system bus 12 to a display device 38. The method of the present invention may be implemented and stored in one or more of the disk units 20, tape drives 40, ROM 16 and/or RAM 14, or even made available to system 13 via a network connection through communications adapter 34 and thereafter processed by CPU 10. Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In general, it is noted that the integrated circuits being designed for element sizing are comprised of a plurality of elements (sometimes millions of elements) including transistors and logic gates. Each such transistor or gate has an inherent signal propagation delay time associated with it, and that delay is typically measured in nanoseconds. Timing constraints within integrated circuits are usually specified in nanoseconds and represent the maximum propagation time of a signal between two different points in an integrated circuit. Such timing constraints must be met in order for the integrated circuit to meet an overall specification relative to the speed with which signal processing must occur to provide a competitive product in the market place or to be compatible with other integrated circuits in a larger system.

The speed of an integrated circuit is proportional to its size and its strength. For example, the size and strength of a transistor, is directly related to the width of a transistor gate for transistor elements. In the design of integrated circuits, in optimizing the chip, an initial design is chosen and while the number of elements, inputs and topology of the chip may remain the same, the sizes are modified for optimal size so that customer or user constraints are met but with a minimum of total chip size.

Figure 2:
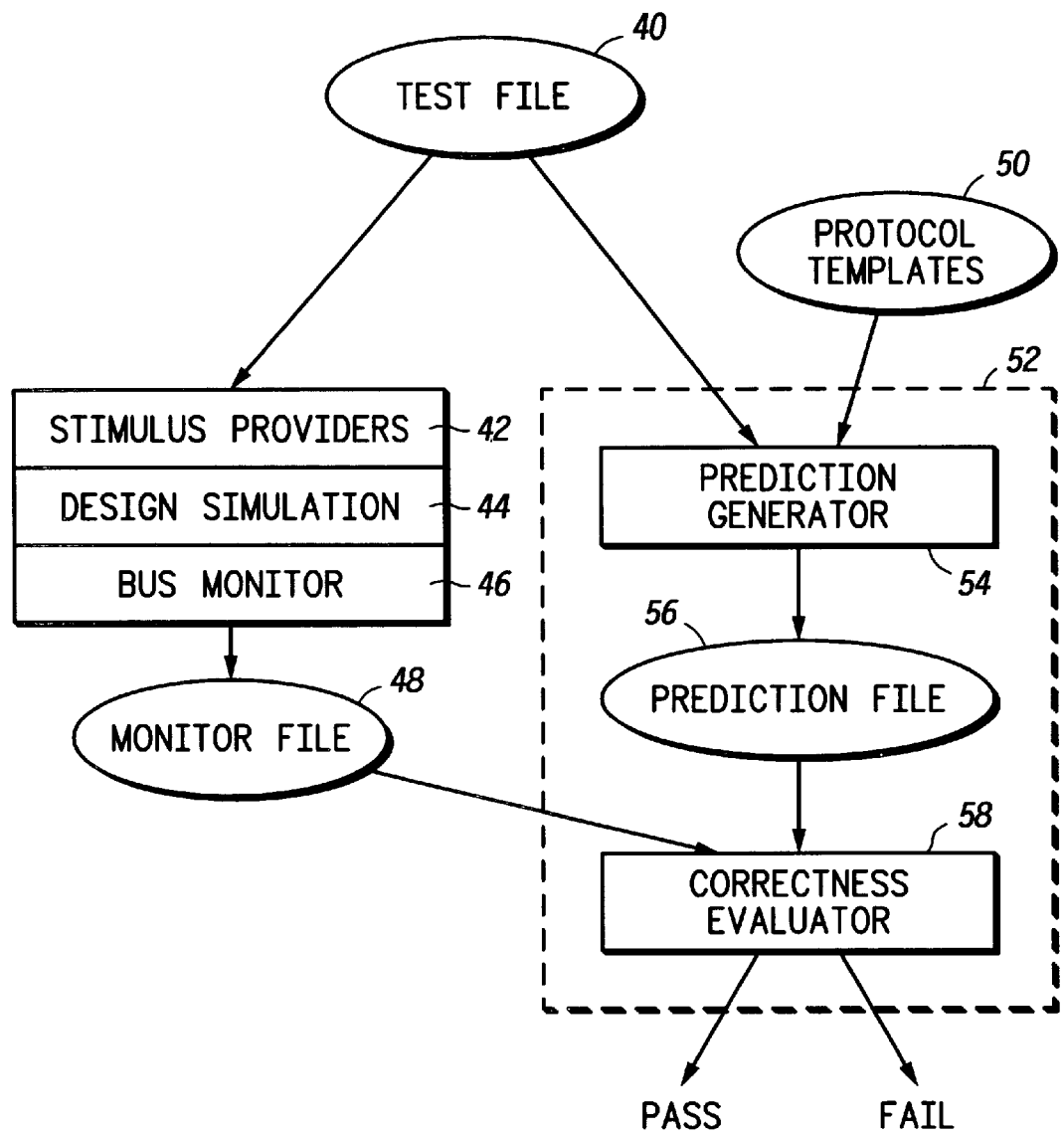
FIG. 2 illustrates, in block diagram form, the methodology of one embodiment of the present invention.

Referring to FIG. 2, the methodology of the present invention is detailed. The method may be used to verify protocol conformance to an electrical interface in a system, and is typically used during the design stage, but may also be useful for debug once a design has been realized. The present method implements a computer model of an electrical circuit to determine if the electrical interface of the circuit operates in conformity with a specified protocol. The results of this verification may result in a design change or may even result in a specification change. The electrical circuit computer model is to imitate the behavior of the circuit. Any number of types of information may be derived from the verification method, including information indicating the amount and degree of comprehension of test coverage.

In one embodiment of the present invention, the electrical interface is a bus. A test file 40 is used to specify a number of agents that act upon the bus during the course of the test. Typical agents are bus masters (transaction initiators) with a list of transactions to perform, slaves (transaction responders) with different characteristics, and data initialization agents for slave memories. Specific agents will differ from one bus configuration to another. Agents are user defined, and may exist for any purpose the user finds convenient, such as an arbitration unit or central controller. For example, in one embodiment of the present invention, an agent is defined to apply all the precharge signals used on the buses when they are not being driven. Further, it is possible to define agents that have no direct effect on the bus. An initialization agent may be used to define common subroutines.

Each agent, whatever its purpose, will have a protocol template. As illustrated in FIG. 2, protocol templates 50 represents a group of protocol templates, containing protocol templates for the various agents that are defined in the system. From protocol templates 50 the template corresponding to the protocol associated with a single agent is instantiated for a given prediction. Test file 40 provides a test description and includes transactions involving a variety of agents. Test file 40 is based on an ordered list of instructions predetermined by the designer. Test file 40 provides information for a given agent that may be accessed by the corresponding protocol template of that agent is provided from protocol templates 50. Both the information from test file 40 and the template protocol from protocol templates 50 is provided to prediction generator 54.

Test file 40 may implement any of a number of formats. Test information includes descriptions of each agent, where descriptions include, but are not limited to, such parameters as agent name, agent type, predecessors to the agent, and initialization information. The test file combines the agents and defines a series of events or transactions that will utilize the bus. In this way, the designer may verify conformity to the specified bus protocol and find bugs. The prediction generator 54 uses specific information about the performance of each agent and the information from test file 40 to predict what should occur on the bus.

Prediction generator 54, prediction file 56, and correctness evaluator 58 are all contained within unit 52. Prediction generator 54 reads information provided by test file 40 and in response outputs a prediction file specific to the test file information. This is done by instantiating the protocol templates for each of the bus agents (from protocol templates 50) with the test file 40 information, and composing a composite prediction graph. Prediction file 56 determines the expected results of running the transactions specified in test file 40. Prediction file 56 in turn becomes an input to correctness evaluator 58. Correctness evaluator 58 checks that there is a one-to-one mapping between transitions present in monitor output file 48 and prediction file 56 (i.e. that actual results match expected results).

Stimulus providers 42 receive instructions in the form of information from test file 40. In response, stimulus providers 42 provide the stimulus for the test to be performed by each agent. The stimulus provided by stimulus providers 42 is provided to the design simulation 44. Design simulation 44 runs a simulation of the design circuit in response to the stimulus provided. The form of stimulus depends on the type of design simulation 44 used. Further, bus monitor 46 monitors signals on the bus in response to the stimulus providers. The output of the bus monitor 46 is provided to monitor file 48. Monitor file 48 stores information as it is received. The information in monitor file 48 is time stamped to indicate the time and sequence of events on the bus. Note that according to one embodiment of the present invention, the time stamp corresponds to a phase of the clock signal. Monitor file 48 includes a reset line which provides the initial state of all the signals provided in the monitor file. Each line in the monitor file contains a time stamp for each signal change, the name of each signal, and the updated value of the signal after the signal change. Monitor file 48 contains this information for each of the signals. This information will be used by correctness evaluator 58 to create a transition list.

Monitor file 48 provides this information to correctness evaluator 58. Correctness evaluator 58 then compares the simulated output results from monitor file 48 with those of prediction file 56. Correctness evaluator 58 then makes a pass or fail determination based upon the match.

Correctness evaluator 58 tests to a "clean bus model." According to a clean bus model, any non-predicted bus state is considered to be an error. Non-predicted bus states are often referred to as "spurious transitions", where a spurious signal changes state at some time other than that specified by the protocol. Noise may be considered a spurious transition, as may an unspecified signal. Note that many verification techniques do not employ the clean bus model as it is a more stringent test than is often thought necessary. The clean bus model provides a stringent condition for checking conformance to the protocol. Acceptance criterion typically requires that all predicted to be driven according to the protocol specification must be actually driven. Further, acceptance criterion requires that no signal be driven at a time other than specified drive times. The latter criterion is more strict than is usually used by hardware designers, who tend to ignore signals driven at a time that is not sampled according to the protocol.

Violation of the clean bus model may require the designer to use a guard condition or a qualification on such signals. If a qualification is implemented incorrectly, undesirable behavior could result. By alerting the designer to spurious transitions, the designer is made aware of potential hazards in the design. Note that a spurious or unexpected transition does not always cause a problem. In certain cases where no hardware is sampling the line at that time, there may be no problem, especially if all the data are getting through. However, any spurious transition constitutes a possible hazard in the design indicating that all the bus agents that sampled the signal are to be properly qualified so that they are not looking at that signal when they should not be. When a spurious transition occurs and it turns out to be harmless, it is often impractical to fix the design. In these situations, it is possible to alter the prediction template to allow specific spurious transitions without lessening the overall stringency of the test in any other area.

As stated previously, prediction generator 54 operates on test file 40 and protocol template 50. Protocol template 50 is illustrated according to one embodiment of the present invention in FIG. 5. A prediction or protocol template is represented as a labeled directed graph in which each node specifies a condition to be evaluated. These conditions typically include partial bus states. Arcs specify timing constraints between pairs of nodes. For the present discussion the term "edge" is used to indicate an arc which carries ordering information. If there is no edge between two nodes then there is no explicit constraint between them.

Figure 3:
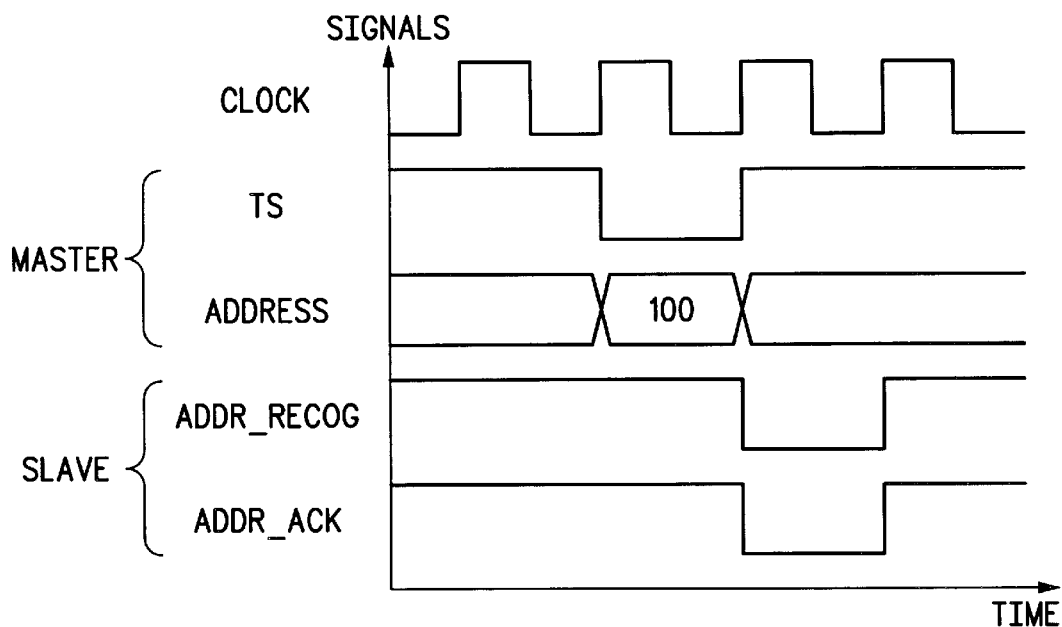
FIG. 3 illustrates in timing diagram form, a protocol according to one embodiment of the present invention.
Figure 4:
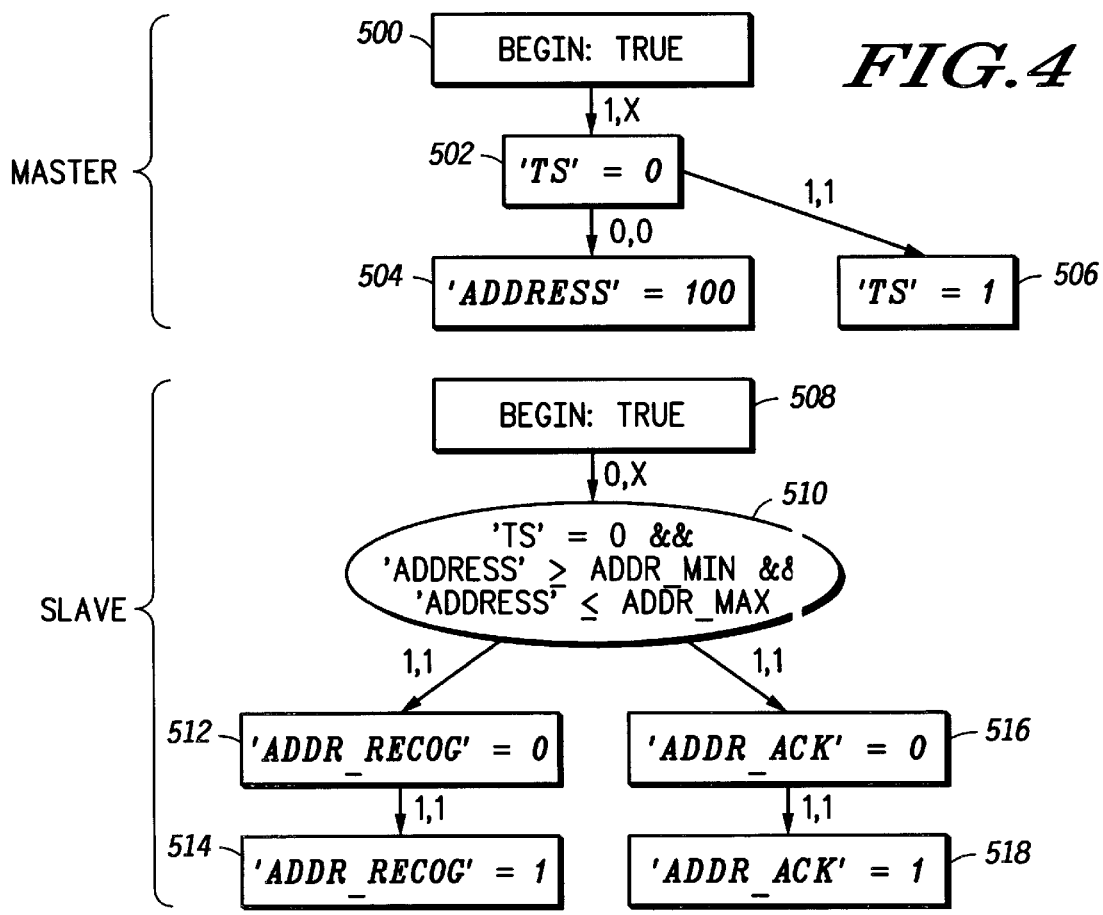
FIG. 4 illustrates, in labeled directed graph form, the protocol of FIG. 3.

To better understand the labeled directed graph, refer to FIGS. 3–4, which illustrate a simple example to help in learning how to read such a graph. FIG. 3 illustrates a simple bus protocol involving a master and slave. The master is defined by two signals, a transaction start signal (TS), and an address (ADDRESS). The slave is defined by two signals, an address recognition signal (ADDR_RECOG) and an address acknowledge (ADDR_ACK). Additionally, there is a a clock signal (CLOCK). According to FIG. 3, TS, ADDR_RECOG, and ADDR_ACK are active low signals. In this example, TS is asserted on a second CLOCK edge. ADDRESS is also driven on the second rising clock edge coincident with the assertion of TS. According to the protocol illustrated in FIG. 3, the slave's ADDR$_{13}$ RECOG is to be asserted one clock after assertion of the master's TS. Also, slave's ADDR_ACK is to be asserted one clock after the master's TS. The behavior illustrated in FIG. 3 indicates the expected result on the bus.

FIG. 4 illustrates the corresponding labeled directed graph defining the master and slave portions of the protocol illustrated in FIG. 3. A node in the graph is illustrated as a rectangular box or an oval, and each node corresponds to an event which may occur during the simulation. A node can be either required or optional. For clarity, in FIG. 4, required nodes are illustrated as rectangular boxes, while optional nodes are illustrated as ovals. If the condition must eventually evaluate to true for the protocol to be correct, the node is required.

When a node's condition evaluates to TRUE it is considered to have fired. A node may be tagged an AND node or an OR node. For clarity, an AND node is illustrated with a solid outline, while an OR node is illustrated with a dashed outline. With reference to an AND node, once the node is evaluated to true, all of its required successor will eventually fire, and as many of its optional successors as desired will also fire. In the case of an OR node, successors of an OR node are considered to be optional. An OR node will sequentially check successors until a first successor fires. At this point, it is not necessary to check the other successors. Successors of an OR node are put into a predetermined evaluation order. The evaluation order is specified by placing numeric tags on edges between OR node and its successors. The tag indicates the ordered position of each successor. Note that typically all successors to an OR are considered optional.

Returning to FIG. 4, at node 500, labeled BEGIN, the condition is by definition TRUE. Node 500 is a required, AND, sample node. A required node, in a labeled directed graph, is one that must be satisfied. Alternate to a required node is an optional node which may be satisfied or may not. A drive node indicates that the condition defined in the node is to be driven on the bus. For clarity, drive nodes are illustrated with italicized text. Alternate to a drive node is a sample only node. For clarity, a sample only node is illustrated with plain text. Note that in one embodiment, a sample only node does not need to sample the bus. A directed arc connects node 500 to node 502, and indicates the processing flow. Node 502 is a required and drive node.

The arc connecting node 500 to node 502 is labeled "1,X." The label indicates a minimum, maximum timing constraint for satisfaction of the condition described by node 502 relative to when node 500 fired. The position to the left of the comma indicates the minimum timing constraint for node 502 with respect to node 500; for this arc the minimum timing constraint is 1. The position to the right indicates the maximum timing constraint for node 502 with respect to node 500, for this arc the maximum timing constraint is described by X, which is discussed below.

According to node 502, TS must be equal to zero for node 502 to verify true. Only TS=0 will satisfy the condition of node 502. The minimum timing constraint of the label constrains the condition of TS=0 to occur no sooner than one clock cycle after the satisfaction of node 500. In other words, there is a one clock cycle delay between the satisfaction of node 500 and the assertion of the TS signal (remember that TS is an active low signal) to satisfy node 502. The X of the label is the maximum timing constraint and indicates that there is no upper limit to the allowable delay after satisfaction of node 500 for TS assertion.

Node 502 and node 504 also have a connecting arc which is labeled 0,0. Likewise, node 502 has a connecting arc to node 506 labeled 1,1. Again, the labels on the arc indicate minimum, maximum timing constraints after satisfaction of node 502 within which the connected node must be satisfied. Node 504 has a condition of ADDRESS=100, which corresponds to the signals driven in FIG. 3. The minimum, maximum timing constraints indicate that the ADDRESS signals are to be driven concurrently with the TS signal. Further, node 506 has a condition of TS=1, which is to occur a minimum of one clock cycle after TS assertion, and a maximum of one clock cycle after TS is negated after the assertion. The labeled directed graph of FIG. 4 is used to embody the protocol defined in FIG. 3.

The slave protocol is also given in FIG. 4. Node 508 is a required, AND, sample node which in this case is always validated as true. Node 508 is connected to node 510 by an arc labeled 0,X. This label indicates that the condition specified in node 510 may occur concurrently with the satisfaction of node 508 or any time thereafter. Node 510 is satisfied when TS is asserted and the ADDRESS signal is between an address minimum and an address maximum value. The minimum address value (ADDR_MIN) together with the maximum address value (ADDR_MAX) define the range of values for which the slave is programmed to respond.

Node 510 is then connected to each of nodes 512 and 516 by arcs labeled 1,1. Node 512 represents the condition where the address recognition signal (ADDR_RECOG) is asserted. Node 516 represents the condition where address acknowledge signal (ADDR_ACK) is asserted. Each of nodes 512 and 516 are to be satisfied one clock cycle after TS is asserted. The protocol embodied in FIG. 4 is consistent with the time defined protocol of FIG. 3.

Node 512 is then connected to node 514 by an arc labeled 1,1. Node 516 is connected to node 518 by an arc labeled 1,1. The labels on both of these arcs indicate that they are to occur one clock cycle after their predecessor node. The condition of node 514 requires that ADDR_RECOG be negated. Note that ADDR_RECOG must be asserted in node 512 prior to being negated in node 514 for node 514 to be satisfied. Node 514 is a successor to node 512, and node 512 is considered a predecessor to node 514. A similar relationship exists between node 516 and 518. Node 518 represents the condition where ADDR_ACK is negated. Again, the ADDR_ACK negation of node 518 is only satisfied after ADDR_ACK is asserted in node 516.

The protocol illustrated in FIG. 4 is used to verify protocol conformity on the bus. Here the master is a first agent and the slave is a second agent. Each agent has a protocol that is specified for the bus. The protocol illustrated in FIG. 4 is not the only protocol associated with the agents, but is exemplary the translation from timing diagrams and constraints to a labeled directed graph embodiment of the protocol.

Figure 5:
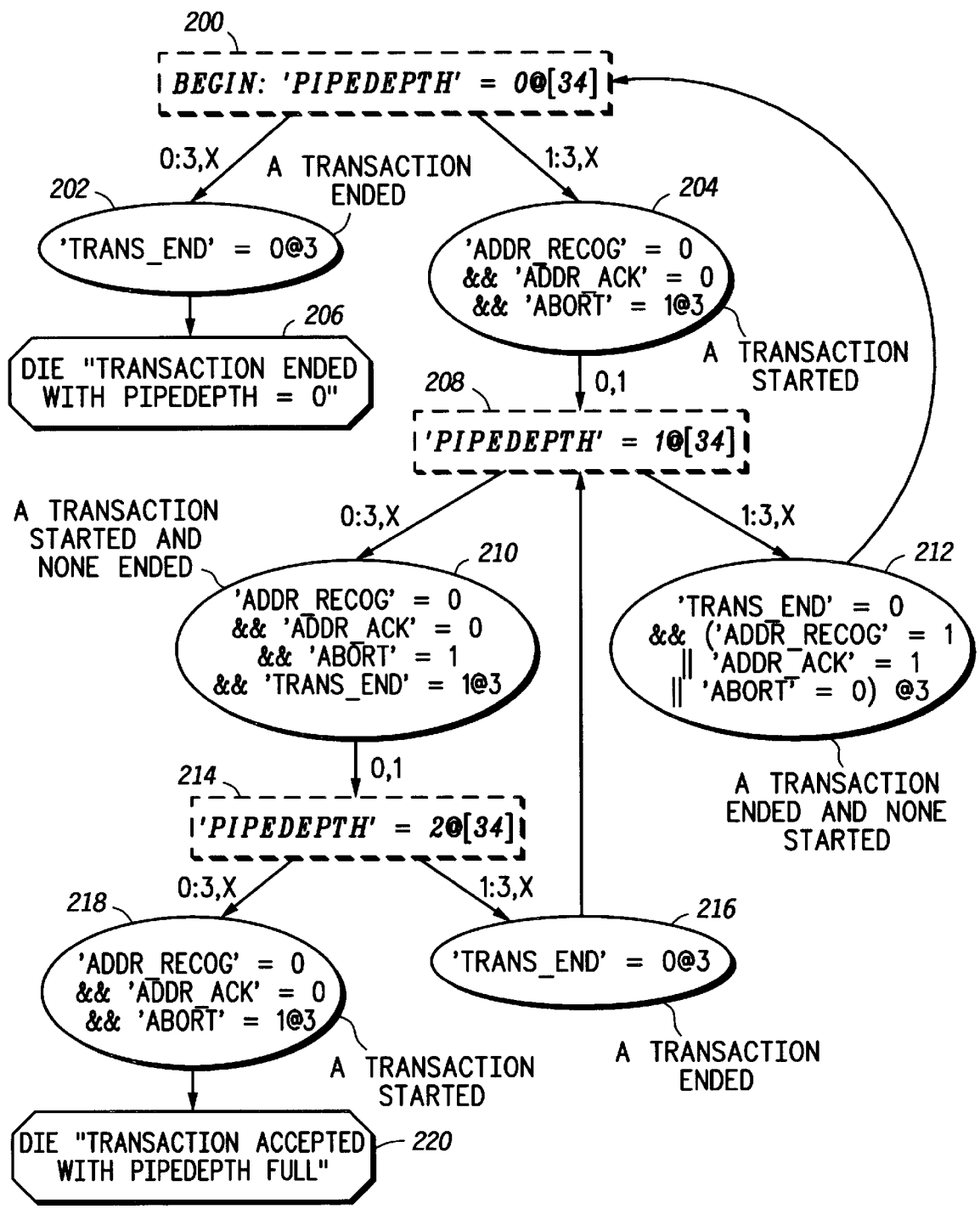
FIG. 5 illustrates, in labeled directed graph form, a protocol template according to one embodiment of the present invention.

FIG. 5 illustrates one embodiment of protocol template 50. FIG. 5 represents an agent that drives a bus signal, PIPEDEPTH, to count the number of transactions that are currently in progress on a pipelined bus. To facilitate comprehension of the labeled directed graph, the following conventions are used and will be further defined hereinbelow. Rectangular shaped nodes are "required" nodes. Oval nodes are "optional" nodes. Octagonal nodes provide the code associated with its connected node. Both required and optional nodes may be "AND" nodes, and are indicated by a single line outlining the node. Both required and optional nodes may be "OR" nodes, and are indicated by dashed lines outlining the node. A "drive" node is indicated by italicized text inside the node. If the text is not italicized the node is a "sample" node. Arrows directed from one node to another are called "arcs" and indicate the direction of processing flow. Comments are provided outside of some nodes to provide the reader with information for clarity and understanding. The convention provided in FIG. 5 is considered to be readily understandable to one of ordinary skill in the art, however alternate embodiments may be used to illustrate the labeled directed graph implementation.

Referring again to FIG. 5, node 200 is a required, OR, drive node. Node 200 has two successors, node 202 and node 204. Node 202 is connected to node 200 by an arc labeled 0:3,X. As node 200 is in OR node, it is necessary to give successors a chronological indication of when they will be evaluated. Providing an evaluation order to successors of an OR node allows deterministic evaluation. The evaluation order is specified by putting numeric tags on the edges, with the lower numbered tags evaluated before the higher numbered tags. The tag in FIG. 5 is coupled with the label on the arc. In this case, node 202 is given an evaluation order of 0 and node 204 is given an evaluation order of 1. The evaluation order is the number to the left of the colon in the label attached to the arc. The number to the right of the colon indicates the minimum, maximum timing constraints, as described above.

Node 200 is a drive node, meaning that the agent being simulated by node 200 is actually driving a signal on the bus.

Node 200 is driving signal PIPEDEPTH. According to the syntax used in this example, PIPEDEPTH is to be asserted at a time that is either the third or fourth phase of a four phased clock, as indicated by the number following the "@" symbol. Note that all of the signals considered herein, excepting PIPEDEPTH, are active low. In one embodiment illustrated in FIG. 5, PIPEDEPTH is a 2-bit counter. In this case, both successors of node 200, nodes 202 and 204, have a minimum timing constraint of 3 clocks with a maximum timing constraint that is unspecified. Node 204 represents a condition where a transaction is started on the bus. The transition start is indicated by assertion of the ADDR_RECOG and ADDR_ACK signals and the negation of the ABORT signal. Each of the conditions specified in node 204 is sampled at a third phase of the clock.

Node 202 represents a condition where a transaction is ended on the bus. The transaction ending is indicated by the assertion of the TRANS_END signal. According to this example, if a transaction is ended with the TRANS_END signal assertion, as defined in node 202, prior to a transaction start, as defined in node 204, then the code associated with node 206 will be executed. Node 206 contains code to execute in case node 202 fires before node 204. According to one embodiment of the present invention, each node has the possibility of having code associated with it. Code is executed at the time its associated node is fired (i.e. evaluates to true). A typical purpose for implementing code execution is to latch bus signals at an early part of a transaction and then use the signals at a later part of the transaction.

When node 204 fires prior to node 202, the condition represented by node 202 will no longer be evaluated. In this case, a transaction has started and the protocol will not continue to look for a transaction to end at node 204. Note that node 202 and node 204 are optional, AND, sample nodes. Node 204 is connected to node 208 by an arc labeled 0,1. Note that there is no evaluation ordering given as node 204 is an AND node, indicating that all of its successors must evaluate to true. In this case, node 204 has a single successor node 208. Node 208 is a required, OR, drive node. 208 represents the condition where PIPEDEPTH is driven to 1. Node 208 has an arc directed to node 210 and an arc directed to node 212. Node 208 also has an arc connected from node 216 directed toward node 208. PIPEDEPTH indicates the number of transactions that are active on the bus. At node 208, PIPEDEPTH is driven to 1, indicating that a transaction has started as defined in node 204.

Node 208 is an OR node where nodes 210 and node 212 are each assigned an evaluation order. Nodes 210 and 212 are sequentially evaluated according to the evaluation order until either one evaluates to true. Node 210 represents the condition of a second transaction start while the first transaction is active (i.e. before the first transaction ends, a second transaction starts). Node 210 is satisfied on ADDR_RECOG assertion, ADDR_ACK assertion, ABORT negation, and TRANS_END negation. Note, to satisfy node 210, each of the four conditions must occur at a time that is at least 3 clock cycles after satisfaction of node 208. There is no maximum timing constraint on the conditions of node 210.

Node 212 represents a condition where a first transaction has ended and no new transaction has started. Node 212 is satisfied on TRANS_END assertion and either ADDR_ negation, ADDR_ACK negation, or ABORT assertion. If a transaction ends and no new transaction is started, as defined in node 212, then the arc directed from node 212 to node 200 indicates a return to node 200. If a second transaction starts before the first transaction has ended, as indicated by node 210, then node 212 will no longer be evaluated. Node 210 is connected to node 214 by an arc labeled 0,1. Again, the label indicates a minimum, maximum timing constraint. Node 214 is a required, OR, drive node, where PIPEDEPTH is driven to a value of 2. Node 214 is connected to each of nodes 218 and 216 by directed arcs. Again, as node 214 is an OR node, nodes 218 and 216 are each given an evaluation order.

Node 218 corresponds to an additional transaction start. Node 216 corresponds to a transaction end. If node 216 fires prior to node 218, process flow is directed back to node 208. According to the protocol illustrated in FIG. 5, the maximum depth for PIPEDEPTH is 2, as node 218 fires on the start of a new transaction and runs the code of node 220 in response. The code in node is run when the pipeline is full, and therefore according to the protocol specified in FIG. 5, the pipeline has a depth of 2, the first transaction of node 204 plus the second transaction of node 210. If a transaction is started at node 218, the pipeline is already at its maximum (PIPEDEPTH=2) and an error should result. The error is indicated by node 220, which contains the code associated with node 218. Note that node 218 and node 220 are connected by a directed arc, without any label. Therefore, there are no constraints between firing of node 218 and execution of node 220. In other words, when node 218 is evaluated as TRUE, node 220 code is executed automatically.

Figure 6:
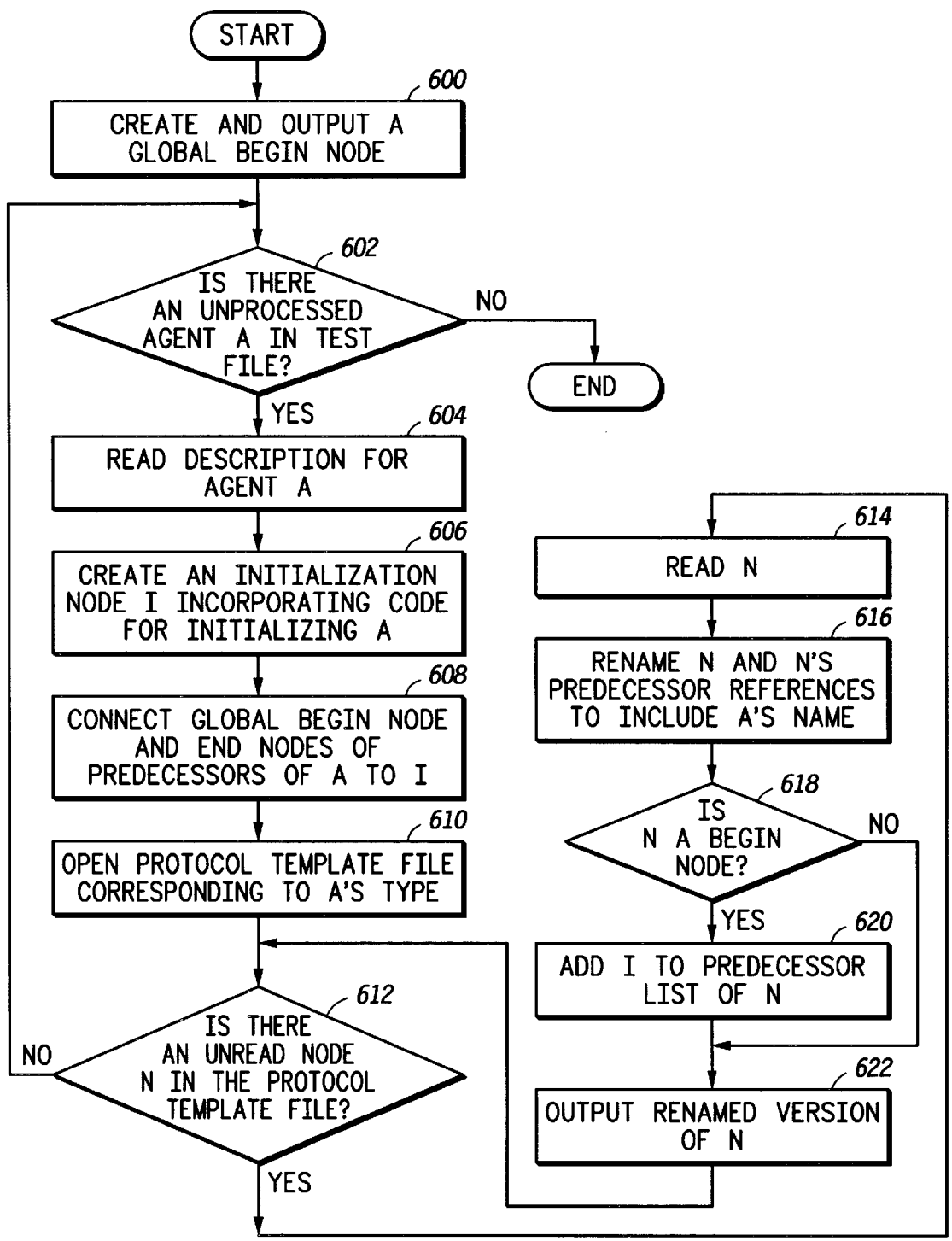
FIG. 6 illustrates, in flow diagram form, a prediction generators according to one embodiment of the present invention.

Prediction generator 54 receives information from test file 40 and protocol template 50 and creates a prediction file 56. FIG. 6 provides a flow chart describing the operation of prediction generator 54. The designer is able to select a test to perform, the test having an associated test file 40. Once prediction generator 54 processing starts, process flow proceeds to block 600, which creates a global BEGIN node to serve as the entry point for prediction file 56. Process flow then proceeds to decision block 602 to determine if there is any unprocessed agent, A, in test file 40. The agents included in test file 40 are selected as needed to perform the selected test. The agents included in test file 40 are listed in a processing order or evaluation order. If there is no unprocessed agent in test file 40, the process ends. In this case, all of the agents have been incorporated into the prediction and prediction generator 54 needs no further information from protocol templates file 50. If there is an unprocessed agent in test file 40, process flow proceeds to block 604, where the description of A is read from test file 40. Each agent is defined by a template, where information is provided to prediction generator 54 regarding the agent. Information in test file 40 may include agent name, agent type, predecessors, and initialization code.

Specifically, at block 606, an initialization node, I, is created which incorporates the code necessary for initialization of agent, A. Initialization code is contained in test file 40 for agent, A. Initialization code typically specifies the characteristics of A assigning values to those variables needed by prediction generator 54 to implement agent, A in a labeled directed graph. As an example, consider the bus master of FIGS. 3 and 4. The variables for A, the bus master, contain information to specify a set of transactions that A will initiate, possibly including timing information.

Flow continues to block 608 where END nodes of predecessors to agent, A, are connected to initialization node, I. The labeled directed graph generated by prediction generator is pieced together from the test file 40 information defining each agent. A BEGIN node is specified for each agent in a labeled directed graph. The BEGIN node serves as the entry point for the graph. Refer to blocks 500 and 508 of FIG. 4. Each agent type that that is a potential predecessor for another agent will also have an END node specified. When the labeled directed graph is created, arcs are placed from the END node of a predecessor agent to the initialization node of a successor agent according to predecessor information in test file 40. In other words, the information regarding agent, A, will include a list of A's predecessors. From this list, prediction generator 54 places arcs from the END node of agents on the list to the initialization node of agent, A. At step 608 END nodes of A's predecessors are connected to the initialization node, I, for this agent. The initialization node subsequently has an arc placed between it and the BEGIN node of its agent. Step 608 positions agent, A, in the labeled directed graph.

Process flow continues to block 610, where a template file for A is opened in the protocol templates file 50. The template file is determined by the agent type information in test file 40 for agent, A. Process flow then continues to decision block 612 to determine if there is an unread node, N, in the protocol template file. In one embodiment of the present invention, there is a protocol template file for each type of agent in the system to be evaluated. If there is no unread node at decision block 612, process flow returns to decision block 602. Note that decision block 612 implements a recursive loop for renaming specific nodes associated with A. On the first pass through the process illustrated in FIG. 6, there will be at least one unread node, as the nodes contained in the protocol template define A. Once all of the nodes that define A have been read and renamed, there will be no unread nodes and process flow will continue to decision block 602 to process a next unprocessed agent. The process continues for all the nodes of all the agents. Note that the same protocol template file may be processed more than once if ore than one agent are defined in test file 40 with the same agent type. Note some protocol template file may be processed more than once if there are more than one agent defined in If there is an unread node in the protocol template file, process flow continues to block 614 to read N from the protocol template file. At block 616, the names of N and N's predecessor references are renamed to include A's name by embedding. Process flow then continues to decision block 618 which checks to see if N is the BEGIN node for this agent. If it is not, then process control continues to block 622. If N is the BEGIN node then the initialization node I is added to the predecessor list of N. Finally, at block 622 predictor generator 54 outputs a renamed version of node N. Process flow then returns to decision block 612. The significance of renaming nodes is to distinguish a specific agent from other similar agents. For example, any bus master that is to have a protocol as defined in FIG. 3 will have the same nodes as described in FIG. 4. As each new agent in the system is processed by prediction generator 54, there is a label attached which distinguishes that agent.

Figure 7:
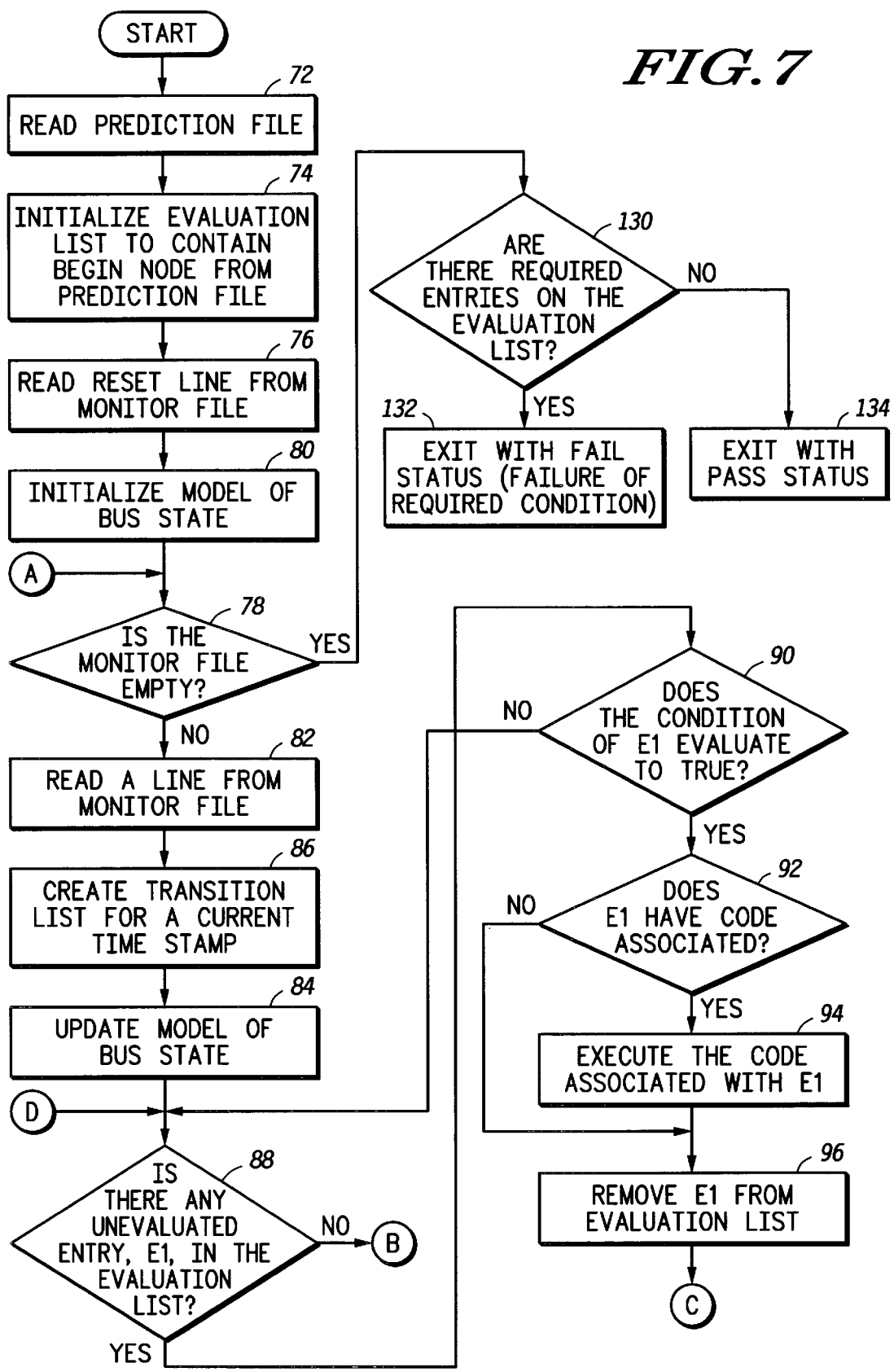
FIGS. 7 & 8 illustrate, in flow chart form, a correctness evaluator according to one embodiment of the present invention.
Figure 8:
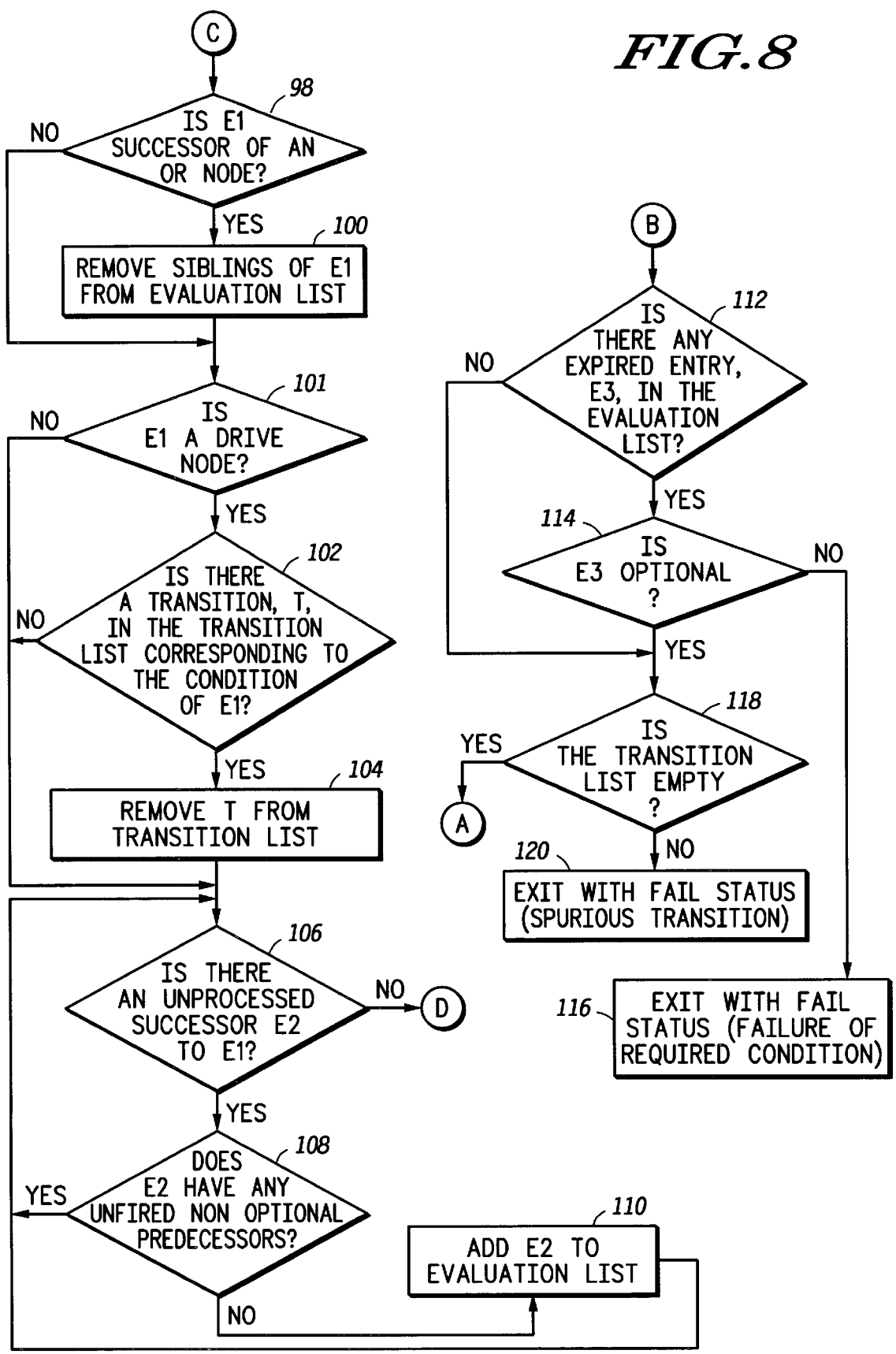

FIGS. 7 and 8 illustrate a flow diagram describing operations of a correctness evaluator 58 from FIG. 2, according to one embodiment of the present invention. It is first necessary to define what conditions constitute a correct simulation. According to the present embodiment, the correctness criterion is stringent as it uses the clean bus model. A correct implementation of a protocol is defined as one in which all required nodes fire within the imposed timing constraints of their incoming edges and no bus signals change state unless there is a drive node corresponding to such a state change.

Referring again to FIG. 2, monitor file 48 contains a distinguished "reset" line that specifies the initial state of all the signals comprising the bus. Each subsequent line in monitor file 48 contains a time stamp and a list of pairs, where the first element in each pair is the name of a given bus signal and the second element is a new value of the given bus signal at the time of the time stamp. Correctness evaluator 58 initializes its own internal model of the state of the bus according to values specified in the reset line of monitor file 48.

Referring to the flow chart of FIGS. 7 and 8, when process flow starts, correctness evaluator 58 reads prediction file 56 at block 72. Prediction generator 54 creates prediction file 56 from the information in test file 40 and protocol templates 50. Flow continues then to block 74 where correctness evaluator 58 initializes an evaluation list to contain the global BEGIN node from prediction file 56. Note that prediction file 56 contains a global BEGIN node which specifies the entry point to the chart. In box 76, the reset line is read from monitor file 48. Correctness evaluator 58 has a model of the bus and an internal model of the bus state. Process flow then continues to block 80, where the internal model is initialized. From box 80 process flow continues to decision box 78, where correctness evaluator 58 determines if monitor file 48 is empty. If monitor file 48 is not empty, then correctness evaluator 58 reads a line from monitor file 48 at block 82. Correctness evaluator 58 then creates a transition list for a current time stamp, which is specified in the line read from monitor file 48. Process flow continues to block 86, where the transition list is created. At block 84, the model of the bus state is updated according to the information read from the line of monitor file 48. A line of monitor file 48 contains information at a given timestamp for every signal described in test file 40.

Process flow then continues to decision block 88 to determine if there is an unevaluated entry in the evaluation list. If there is an unevaluated entry, E1, then decision block 90 determines if the condition of E1 evaluates to TRUE. If the condition of E1 does not evaluate to true, process flow returns to decision block 88. If the condition of E1 does evaluate to true, then process flow continues to decision block 92 to determine if E1 has code associated with it. If E1 has code, the code is executed in block 94. If E1 has no associated code, process flow continues to box 96. Additionally, once the code associated with E1 is executed, process flow continues to block 96. At block 96, E1 is removed from the evaluation list.

Process flow continues to decision block 98, where it is determined if E1 is a successor of an OR node. If E1 is a successor to an OR node, then the siblings of E1 are removed from the evaluation list at block 100. According to one embodiment of the present invention, when an OR node fires, all of its successors are placed in the evaluation list for further evaluation, but as soon the first of these successors fires, all of its siblings are removed from the evaluation list. Note that in one embodiment of the present invention, all successors of an OR node are considered optional. Additionally, all successors of an OR node are added to the evaluation list regardless of whether all the predecessors have been fired. If E1 is not a successor of an OR node, process flow continues to decision box 101. If E1 is the successor of an OR node and the siblings are removed from the evaluation list at block 100, then process flow continues to decision block 101. At decision block 101, it is determined if E1 is a drive node. If E1 is not a drive node, then process flow continues to decision block 106. If E1 is a drive node, process flow continues to decision block 102 to determine if there is a signal transition, T, in the transition list corresponding to the condition of E1. If there is no signal transition, T, then process flow continues to decision block 106. However, if there is a signal transition T, then T is removed from the transition list in block 104 and process flow continues to block 106.

At decision block 106 it is determined if there is an unprocessed successor, E2, to E1 that has not been processed since E1 was fired. If there is such an E2, then decision block 108 determines if E2 has any unfired predecessors that are not optional nodes. If there are no unprocessed successors to E1, then process flow returns to decision block 88. As discussed previously, successors of an OR node are added to an evaluation list regardless of whether predecessors have fired. If there are no unfired non-optional predecessors, then E2 is added to the evaluation list in block 110. If there are unfired non-optional predecessors, process flow returns to decision block 106 to determine if there are other unprocessed successors to E1. If E2 has no unfired non-optional predecessors, then E2 is added to the evaluation list in block 110 and process flow returns to decision block 106. When all successors to E1 have been processed, control flow returns from decision block 106 to decision block 88.

Returning to decision block 88, if there are no unevaluated entries in the evaluation list, process flow continues to decision block 112 to determine if there is an expired entry, E3, in the evaluation list. If there are no expired entries then process flow continues to decision block 118. If there is an expired entry, decision block 114 determines if it is optional. If E3 is not optional, correction evaluator 58 will exit with a FAIL status at block 116. An exit at this point indicates a failure of a required condition. If E3 is optional, process flow continues to decision box 118 to determine if the transition list is empty. If the transition list is empty at decision block 118, process flow returns to block 78. If the transition list is not empty at decision block 118, then process flow continues to block 120, where correction evaluator 58 exits with FAIL status. An exit at this point indicates a spurious transition, i.e. an unspecified state or transition occurred on the bus.

Returning again to decision block 78 of FIG.7, if monitor file 48 is empty, process flow continues to decision block 130 to determine if there are required entries on the evaluation list. If there are such entries, correction evaluator 58 will exit with a FAIL status at block 132. An exit at this point indicates a failure of a required condition. Returning to decision block 130 if there are no required entries on the evaluation list, correction evaluator 58 will exit with a PASS status at block 134.

The present invention offers a method for verifying bus protocols which uses a strict condition for checking conformance to the protocol. The method provides that all signals predicted to be driven according to the protocol specification are driven and that no signals are driven at a time when they are not specified to be driven. The present invention offers a method of recognizing when a guard condition or qualification is needed for the signals available on the bus. This feature offers circuit designers a method to detect potential hazards in their design. In one embodiment, the present invention offers a method of storing state and timing history information, adding valuable information for debug and analysis. By storing status information about the electrical interface and information about when transactions start, the circuit designer is provided a flexible verification tool.

The present invention allows for protocol coverage analysis computation automatically and insures that the test plan has covered all the relevant aspects of the protocol. Additionally, the present invention offers a flexible method to separate protocol-defined timing and constraints from implementation-dependent timing constraints. This is advantageous as the amount of delay incurred by access to an external memory device is often variable. The present invention offers a modular method of protocol specification. Protocol templates for different types of agents are used to specify the conditions of any number of that type of agent in the system.

The present invention offers a method of detecting noise on the bus which occurs at times other than when the protocol says the signals are to be sampled. This allows detection of possible hardware hazards based solely on improperly driven signals. According to one embodiment of the present invention, optional transitions are handled in a consistent manner.

Note that while one embodiment of the present invention uses a prediction file generated according to a specific test file 40, prediction file 56 could also be a general test file. An advantage of the present invention is that it allows input from a test program to tailor bus signal change predictions and verify that the test program performs as it is programmed to perform. The present invention allows designers to create flexible test programs and behavior models which target the creation of specific bus conditions.

We claim:

1. A method for verifying conformance of a protocol for an electrical interface, the electrical interface having a plurality of signals, the method comprising the steps of:

selecting a test to be performed;

providing one of an electrical circuit having the electrical interface and a computer model of the electrical circuit having the electrical interface;

applying electrical stimulus to the one of the electrical circuit and the computer model of the electrical circuit;

providing a monitor to monitor the plurality of signals;

detecting a transition of at least one of the plurality of signals;

in response to said step of detecting, storing state and timing information of the at least one of the plurality of signals;

storing a plurality of protocol constraints within a protocol template;

deriving a prediction file from the test to be performed and the protocol template, the prediction file including the plurality of protocol constraints;

comparing the state and timing information of the at least one of the plurality of signals to the plurality of protocol constraints; and in response to said step of comparing, determining if the one of the electrical circuit and the computer model of the electrical circuit conform to the protocol for the electrical interface, wherein the step of storing a plurality of protocol constraints within a protocol template further comprises the step of:

representing the plurality of protocol constraints within a directed graph having a plurality of nodes, wherein each one of the plurality of nodes has a first attribute characterization of OPTIONAL/REQUIRED, and wherein at least one of the plurality of protocol constraints specifies a timing range.

2. A method as in claim 1, further comprising the step of:

determining a first agent required by the test to be performed; and extracting initialization information for the first agent from the test to be performed.

3. A method as in claim 1, further comprising the steps of:

determining a first agent and a second agent required by the test to be performed;

storing a first plurality of protocol constraints corresponding to the first agent within a first protocol template;

storing a second plurality of protocol constraints corresponding to the second agent within a second protocol template; and deriving the prediction file from the test to be performed and the first and second protocol templates, the prediction file including the first and second plurality of protocol constraints.

4. A method as in claim 3, wherein the first plurality of protocol constraints and the second plurality of protocol constraints are identical.

5. A method as in claim 3, wherein the step of deriving the prediction file from the test to be performed and the first and second protocol templates further comprises the step of:

ordering evaluation of the first and second protocol templates.

6. A method as in claim 5, wherein the step of ordering further comprises the step of:

determining the ordering to be used based upon the test to be performed.

7. A method as in claim 1, wherein the plurality of protocol constraints is a subset of all protocol constraints required by the protocol.

8. A method as in claim 1, further comprising the step of:

in response to said step of comparing, detecting that the transition of the at least one of the plurality of signals is spurious.

9. A method as in claim 1, wherein each one of the plurality of nodes has a second attribute characterization of AND/OR.

10. A method as in claim 9, further comprising the step of:

specifying an evaluation order of successors for each one of the plurality of nodes that has an OR attribute characterization.

11. A method as in claim 9, wherein each one of the plurality of nodes has a third attribute characterization of SAMPLE ONLY/DRIVE.

12. A method as in claim 1, further comprising the steps of:

evaluating a first node from the plurality of nodes, the first node having an evaluated condition;

providing phase constraints corresponding to the evaluated condition.

13. A method as in claim 1, further comprising the step of:

providing executable code corresponding to a first one of the plurality of nodes; and executing the executable code when a condition of the first one of the plurality of nodes evaluates to be true.

14. A method as in claim 13, wherein execution of the executable code provides status information regarding the electrical interface.

15. A method as in claim 14, wherein the status information indicates when a bus transaction starts.

16. A method as in claim 1, wherein the electrical interface is a bus on an integrated circuit.

17. A method as in claim 1, further comprising the step of:

extracting all state information for a selected point in time.

18. A method as in claim 17, wherein the selected point in time is a selected phase of a clock signal.

19. A method as in claim 1, wherein the step of comparing further comprises determining test coverage for protocol conformity.

20. A method of manufacturing integrated circuits utilizing the method in claim 1 which further comprises:

generating a transistor placement file from the computer model of the electrical circuit;

creating a set of one or more lithographic masks from the transistor placement file; and fabricating a plurality of integrated circuits from the set of one or more lithographic masks.

21. A method as in claim 1, wherein the timing range is specified by a maximum value and a minimum value, and wherein the maximum value is infinite.

22. Computer readable medium containing computer software encoded in a machine readable format for verifying conformance of a protocol for an electrical interface, the electrical interface having a plurality of signals, said computer software comprising:

a set of computer instructions for providing a computer model of an electrical circuit having the electrical;

a set of computer instructions for applying electrical stimulus to the computer model of the electrical circuit;

a set of computer instructions for providing a monitor to monitor the plurality of signals;

a set of computer instructions for detecting a transition of at least one of the plurality of signals;

a set of computer instructions for storing state and timing information of the at least one of the plurality of signals;

a set of computer instructions for storing a plurality of protocol constraints within a protocol template, wherein the plurality of protocol constraints are represented within a directed graph having a plurality of nodes, wherein each one of the plurality of nodes has a first attribute characterization of OPTIONAL/REQUIRED, and wherein at least one of the plurality of protocol constraints specifies a timing range;

a set of computer instructions for deriving a prediction file from a test to be performed and the protocol template, the prediction file including the plurality of protocol constraints;

a set of computer instructions for comparing the state and timing information of the at least one of the plurality of signals to the plurality of protocol constraints; and a set of computer instructions for determining if the computer model of the electrical circuit conforms to the protocol for the electrical interface.

23. A method of manufacturing the computer readable medium in claim 22 which comprises:

encoding the computer software in machine readable format on the computer readable medium.

* * * * *